(12) United States Patent
Ramsay et al.

(10) Patent No.: US 12,091,228 B2
(45) Date of Patent: *Sep. 17, 2024

(54) DISPENSING DEVICE

(71) Applicant: ELIXA LIMITED, Hamilton (NZ)

(72) Inventors: Peter John Ramsay, Hamilton (NZ); Benjamin Harry Alder, Hamilton (NZ)

(73) Assignee: ELIXA LIMITED, Hamilton (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,076

(22) Filed: Mar. 23, 2023

(65) Prior Publication Data

US 2023/0227222 A1 Jul. 20, 2023

Related U.S. Application Data

(63) Continuation of application No. 16/627,885, filed as application No. PCT/NZ2018/050095 on Jul. 11, 2018, now Pat. No. 11,639,257.

(30) Foreign Application Priority Data

Jul. 11, 2017 (NZ) ........................................ 733690

(51) Int. Cl.
    *B65D 51/28* (2006.01)
(52) U.S. Cl.
    CPC ................................ *B65D 51/2821* (2013.01)
(58) Field of Classification Search
    CPC .. B65D 51/24; B65D 51/245; B65D 51/2835; B65D 51/28; B65D 51/2821;
    (Continued)

(56) References Cited

U.S. PATENT DOCUMENTS

| 3,802,604 A | 4/1974 | Morane et al. |
| 6,527,110 B2 | 3/2003 | Moscovitz |

(Continued)

FOREIGN PATENT DOCUMENTS

| EP | 2982612 A1 | 2/2016 |
| WO | 2002092440 A2 | 11/2002 |

(Continued)

OTHER PUBLICATIONS

Supplementary European Search Report for European Application No. 18832648, dated Mar. 12, 2021, 6 pages.

(Continued)

*Primary Examiner* — King M Chu
(74) *Attorney, Agent, or Firm* — Ryan L. Marshall; Barnes & Thornburg LLP

(57) ABSTRACT

A reusable dispensing device for dispensing contents into a container. The device including a body having a chamber configured to receive a capsule and configured to sit on an opening of the container. A portion of the body being movable between an unsealed first position and an engaged second position. Piercing means are configured to pierce the capsule, and sealing means are configured to seal the container in the engaged second position. Movement of the body from the unsealed first position to the engaged second position to seal the container engages the piercing means to pierce the capsule and dispense contents from the capsule into the container.

20 Claims, 13 Drawing Sheets

(58) Field of Classification Search
CPC .............. B65D 25/08; B65D 81/3211; B65D 81/3266; A47G 19/22
USPC ............ 215/227, 6, 228; 206/219, 222, 217
See application file for complete search history.

(56) References Cited

U.S. PATENT DOCUMENTS

| | | | |
|---|---|---|---|
| 7,721,880 B2* | 5/2010 | Pearce | B65D 51/2821 |
| | | | 206/568 |
| 8,328,037 B2* | 12/2012 | Wu | B65D 47/242 |
| | | | 220/717 |
| 2005/0126632 A1 | 6/2005 | Farrell et al. | |
| 2008/0223485 A1 | 9/2008 | Nyambi et al. | |
| 2008/0314775 A1* | 12/2008 | Owoc | B65D 55/0854 |
| | | | 206/222 |
| 2014/0361016 A1 | 12/2014 | Moreau | |

FOREIGN PATENT DOCUMENTS

| | | |
|---|---|---|
| WO | 2009057940 A1 | 5/2009 |
| WO | 2014142658 A1 | 9/2014 |

OTHER PUBLICATIONS

International Search Report and Written Opinion for International Application No. PCT/NZ2018/050095, dated Sep. 28, 2018, 13 pages.

\* cited by examiner

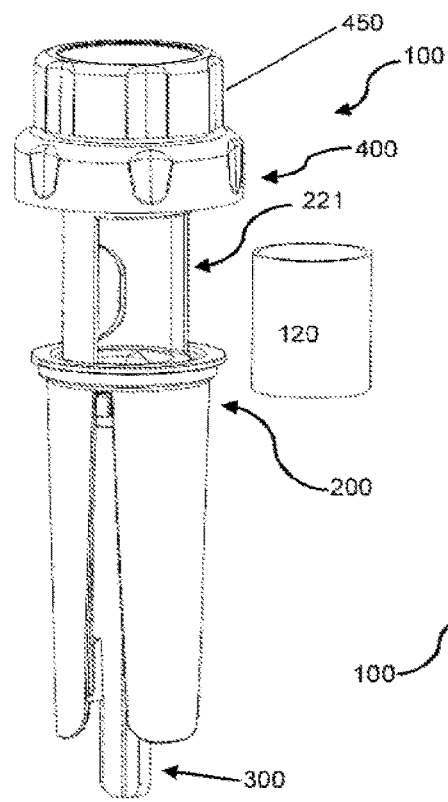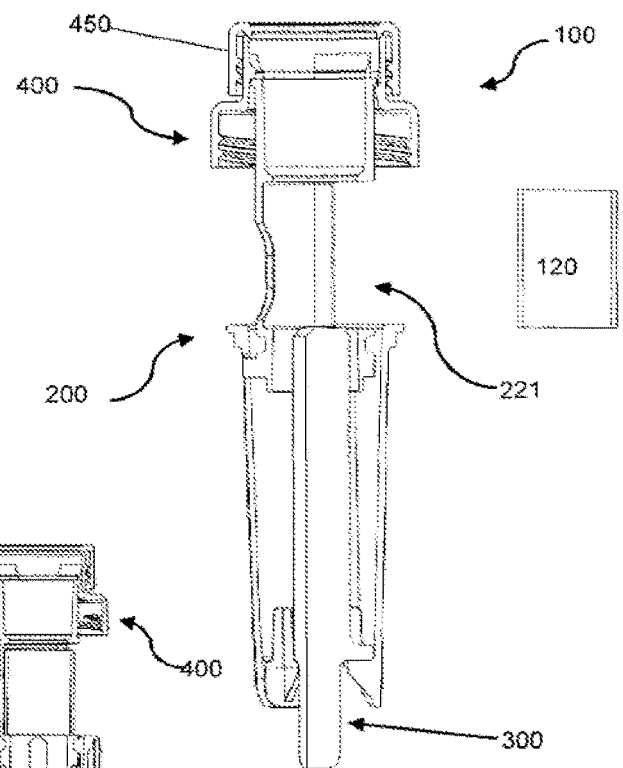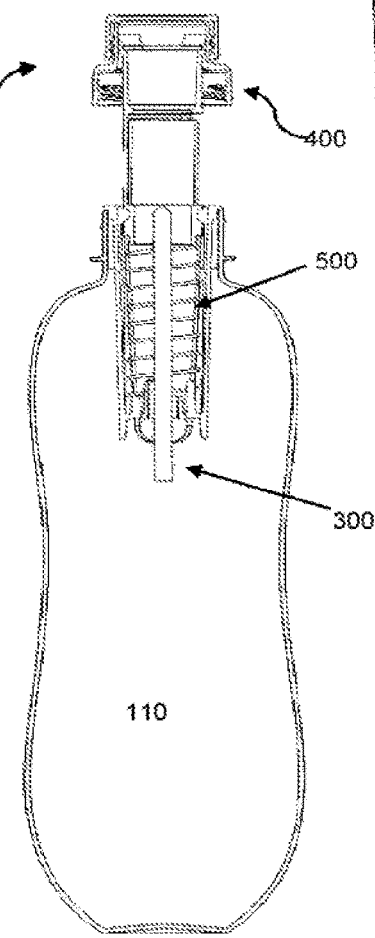
Figure 1
Figure 2
Figure 3

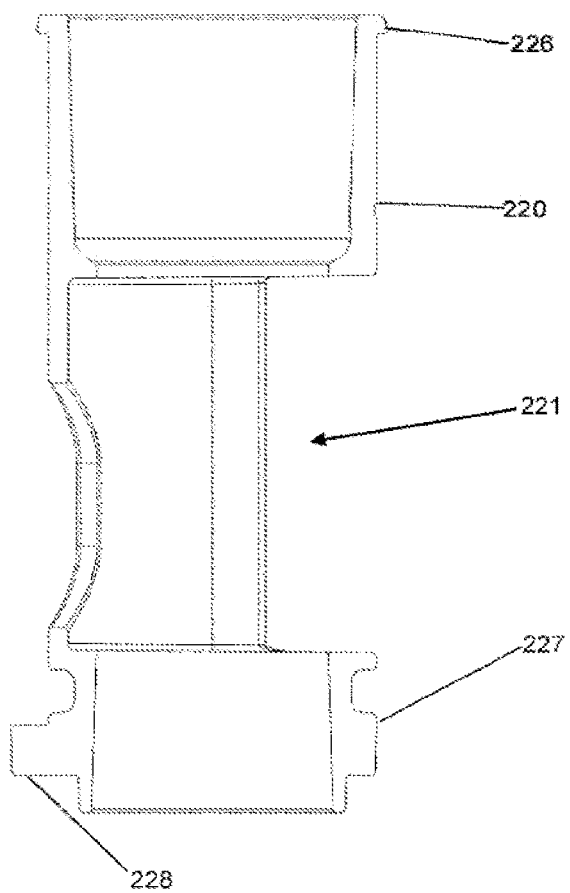
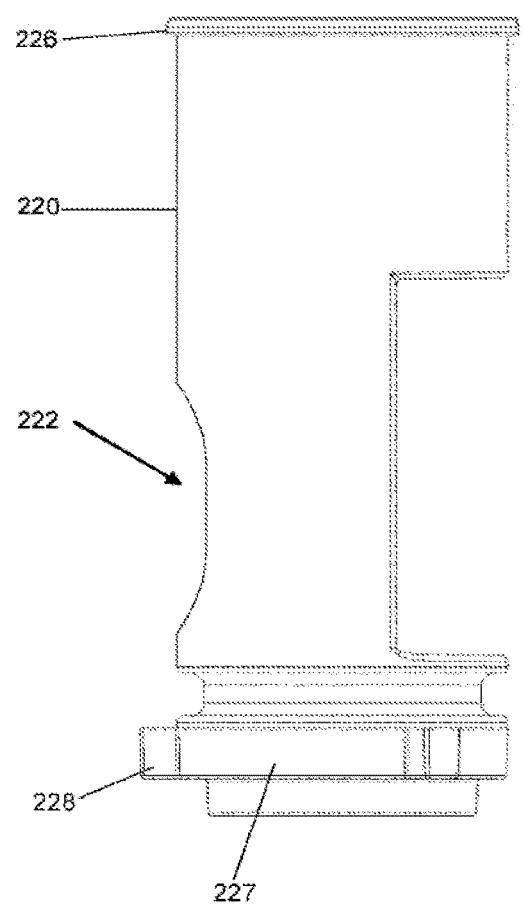
Figure 13
Figure 14

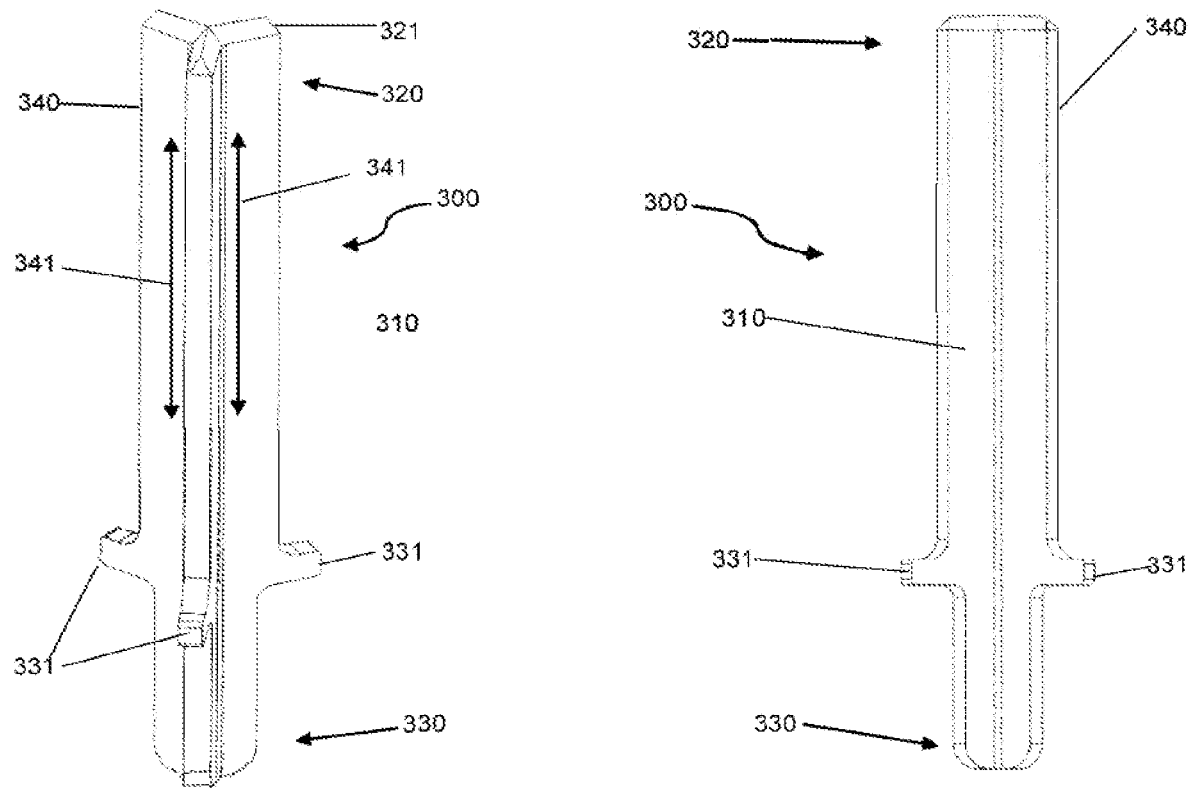
Figure 22
Figure 23
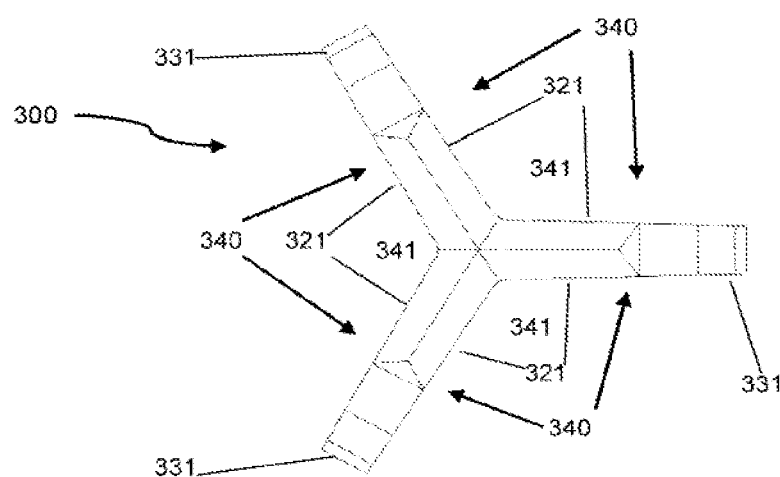
Figure 24

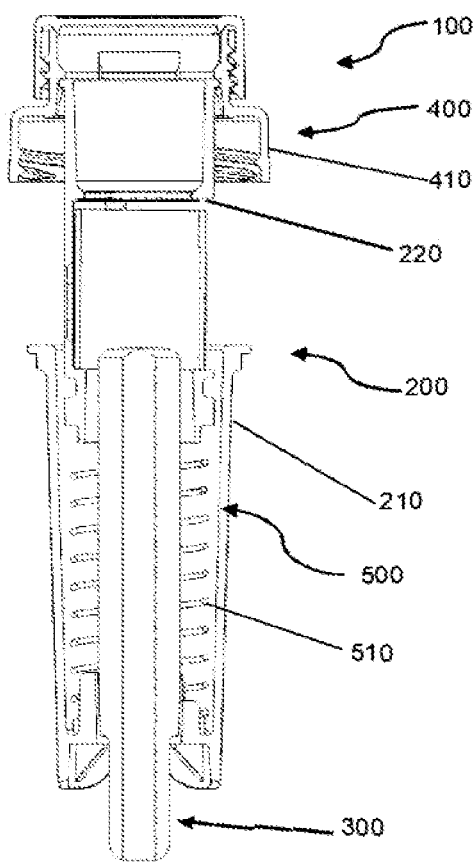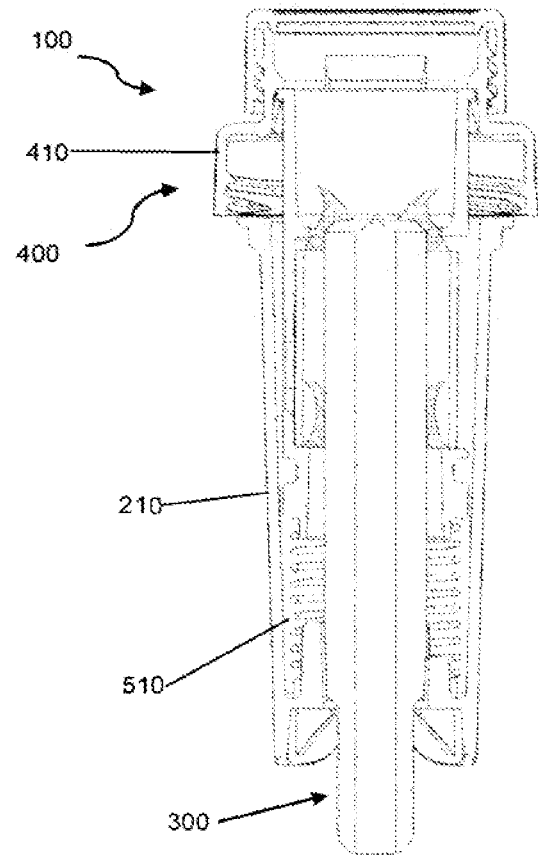
Figure 32
Figure 33

DISPENSING DEVICE

CROSS-REFERENCE TO RELATED APPLICATIONS

This United States application is a continuation application of U.S. patent application Ser. No. 16/627,885, filed 31 Dec. 2019, which is a National Phase of PCT Application No. PCT/NZ2018/050095 filed 11 Jul. 2018, which claims priority to New Zealand Application No. 733690 filed 11 Jul. 2017, each of which are incorporated herein by reference in their entirety.

TECHNICAL FIELD

The present invention relates to a dispensing device for dispensing contents into a container. More specifically it relates to a reusable dispensing device for dispensing contents stored within a pod or capsule into a container.

BACKGROUND ART

Bottled beverages are typically manufactured by pre-preparing the beverage followed by bottling and distribution. The preparation of such beverage involves mixing concentrates in large quantities of water.

Disadvantages with such an approach lies in the fact that as the beverages are pre-prepared the shelf-life of such products have already been reduced by the time they reach the shelves. This often leads to delays of days, weeks or months before the beverage is ultimately consumed the by consumer. In some circumstances, the potency or effectiveness of some components in certain drinks such as vitamins or minerals may also degrade over this time, resulting in a less than desirable product.

Further, from the perspective of the consumer it is often desirable to have a drink or beverage prepared when required to ensure the drink is as fresh as possible and also providing them with the knowledge that they know when and how the beverage was prepared. Additionally, this means provides an added benefit in that wastage from mass produced beverages past their use by date would be reduced.

Previous attempts to address this problem include using sachets or tablets and dissolving them in a liquid. Such forms are typically messy, resulting in inadvertent spillage or wastage, and generally inconvenient—requiring the user to find a suitable cup or container in order to mix the contents.

Dispensing devices have also been designed to dispense an ingredient capsule into a container or bottle. However, such devices are commonly complex devices, requiring assembly of multiple components and/or only adapted for single use only with proprietary containers. Often, failure or loss a single component in such devices rendered the entire device unusable.

Single use devices are undesirable as they are configured and loaded with an ingredient capsule on the container in a sealed arrangement. There is no option for the user to access the chamber to reuse the device, the user is forced to discard the device and container after use, leading further unnecessary waste.

It is desirable to have a dispensing device which is reusable, simple and convenient to use and doesn't require assembly of multiple components for each use.

It is an object of the present invention to address the foregoing problems or at least to provide the public with a useful choice.

DISCLOSURE OF THE INVENTION

According to one aspect of the present invention there is provided a reusable dispensing device for dispensing contents into a container, the device including:
  a body having a chamber configured to receive a capsule, the body being configured to sit within an opening of the container and is moveable between an unsealed first position and an engaged second position;
  piercing means configured to pierce the capsule;
  sealing means configured to seal the container in the engaged second position;
  wherein movement of a portion of the body from the unsealed first position to the engaged second position to seal the container engages the piercing means to pierce the capsule and dispense contents from the capsule into the container.

In preferred embodiments, the present invention includes the body having a first member and a second member in a telescopic configuration.

Preferably the first member and second member are substantially cylindrical, having a hollow interior space to allow for telescopic movement of the first member and second member.

Preferably the second member is configured to telescopically slide into the first member.

Preferably the first member is configured to sit within the interior of the container.

Preferably the first member includes an upper lip portion to enable the body to sit within the opening of the container without falling into the container.

Preferably the first member further comprises at least one groove channel extending axially down the first member to guide the telescopic path of movement of the second member within the first member.

Preferably the first member further includes retaining members located on an internal surface configured to house the piercing means.

Preferably the retaining members are in the form of at least one hook, extending partially upwardly towards the upper lip portion.

Preferably the retaining members comprises a pair of hooks, defining a gap between the hooks to receive the piercing means.

Preferably the second member includes an opening to define the chamber.

Preferably the second member further includes an aperture on a back wall opposite the opening to provide access to the chamber.

Preferably the sealing means is rotatably connected to the second member.

Preferably the connection between the sealing means and second member allows for unrestricted rotation of the sealing means relative to the second member about a single rotational axis to allow for sealing of the device onto the opening of the container.

Preferably the second member includes an upper external lip portion to communicate with the sealing means.

Preferably the second member includes a lower external lip portion to communicate with the first member.

Preferably the second member further comprises at least one protruding arm extending from the lower external lip portion.

Preferably at least one protruding arm is configured to engage with at least one groove channel of the first member.

In preferred embodiments, the present invention includes sealing means comprising a removable cap to provide access to the dispensed contents in the container.

Typically, the present invention includes piercing means comprising a main member having a first end and a second end.

Preferably the main member is detachably connected within the interior hollow space of the first member of the body.

Preferably the main member is elongated and includes at least two fins to define flow channel(s) along the elongated main member.

Preferably the main member includes at least one beveled edge located on the first end to pierce a wall in the capsule.

Preferably the main member includes at least one arm extending outwardly near the second end.

Preferably the at least one arm is configured to communicate with the retaining members located on the first member to connect the elongated main member to the first member within the internal space therein.

Preferably the piercing means is configured to pierce at least one wall of the capsule to dispense the contents in the capsule.

Preferably the piercing means is configured to pierce at least a bottom wall of the capsule.

Preferably the piercing means is configured to pierce two or more walls of the capsule.

Preferably the piercing means is configured to pierce a bottom and top wall of the capsule.

In a further embodiment, the present invention further includes biasing means to bias the device towards an unsealed first position to expose the chamber to a user when the device is not in use.

Preferably the biasing means includes a spring or other resilient material located within the body.

In a further embodiment, the body, piercing means and sealing means of the device are detachably connected to allow for cleaning of the components.

The present specification describes improvements to dispensing devices, and more particularly to reusable dispensing devices for use in dispensing contents from a capsule into a container.

Throughout the present specification reference to the term "capsule" should be understood as meaning a small case, pod or container adapted to store at least one substance or ingredient therein. The capsule may contain multiple compartments separated by an internal wall(s) to separately store two or more different substances or ingredients therein. The capsule may be sealed at one or both ends by plastic, foil or any other frangible material designed to break when appropriate force is applied. Alternatively, the capsule can be sealed by a biodegradable or water soluble material designed dissolve once in contact with water.

The substances or ingredients contained within the capsules can be in the form of a liquid, a solid such as a powder or any substantially flowable substance.

According to another aspect of the present invention there is provided a reusable dispensing device substantially as described above wherein the device includes:
a body having a telescopically connected first and second member, the first member configured to sit within an opening of the container in an unsealed first positon,
the second member including a chamber configured to receive a capsule, piercing means configured to pierce at least one wall of the capsule;
sealing means rotatably connected to the second member;
wherein the sealing means is configured to seal the device onto an opening of the container in a sealed position;
wherein telescopic movement of the second member to the sealed position to seal the device onto the container engages the piercing means to pierce the capsule and dispense the contents from the capsule into the container.

Preferably the first member and second member are substantially cylindrical, having a hollow interior space.

Preferably the second member is configured to telescopically slide into the first member.

Preferably the first member is configured to sit within an interior space of the container.

Preferably the first member includes an upper lip portion to enable the body to sit within an opening of the container without falling into the container.

Preferably the first member further comprises at least one groove channel extending axially down the first member to define a telescopic path of movement for the second member within the first member.

Preferably the first member further includes retaining members located on an internal surface configured to house the piercing means.

Preferably the retaining members are in the form of a hook, extending partially upwardly towards the upper lip portion.

Preferably, the retaining members comprises a pair of hooks, defining a gap between the hooks to receive the piercing means.

Preferably the second member includes an opening to define the chamber.

Preferably the second member further includes an aperture to provide access to the chamber.

Preferably the connection between the sealing means and second member allows for unrestricted rotation of the sealing means relative to the second member about a single rotational axis.

Preferably the second member includes an upper external lip portion to communicate with the sealing means.

Preferably the second member includes a lower external lip portion to communicate with the first member.

Preferably the second member further comprises at least one protruding arm extending from the lower lip portion.

Preferably at least one protruding arm is configured to engage with at least one groove channel of the first member.

In a further embodiment, the present invention includes sealing means including a removable cap to provide access to the dispensed contents in the container.

Typically, the present invention further includes piercing means including a main member having a first end and a second end.

Preferably the main member is elongated and includes at least two fins to define flow channel(s) along the elongated main member.

Preferably the main member includes at least one beveled edge located on the first end to pierce a wall in the capsule.

Preferably the main member includes at least one arm extending outwardly near the second end.

Preferably the at least one arm is configured to communicate with the retaining members located on the first member to connect the elongated main member to the first member.

Preferably the piercing means is configured to pierce at least one wall of the capsule to release the contents in the capsule.

Preferably the piercing means is configured to pierce two or more walls of the capsule.

Preferably the piercing means is configured to pierce a bottom and top wall of the capsule.

In a further embodiment, the present invention includes biasing means to bias the device towards an unsealed first position.

Preferably the biasing means includes a spring located on within the body.

BRIEF DESCRIPTION OF THE DRAWINGS

Further aspects of the present invention will become apparent from the ensuing description which is given by way of example only and with reference to the accompanying drawings in which:

FIG. 1 is a perspective view of an embodiment of the device in an unsealed first position;

FIG. 2 is a cross-sectional view of an embodiment of the device in an unsealed first position;

FIG. 3 is a cross-sectional side view of an embodiment of the device resting on a container in an unsealed first position;

FIG. 13 is a cross-sectional side view of the second member of the body;

FIG. 14 is a side view of the second member of the body;

FIG. 22 is a perspective view of the piercing means;

FIG. 23 is a cross-sectional view of the piercing means;

FIG. 24 is a top view of the piercing means;

FIG. 32 is a cross-sectional view of a further embodiment of the device as shown in FIG. 2, comprising biasing means; and FIG. 33 is a cross-sectional view of a further embodiment of the device as shown in FIG. 5, comprising biasing means.

BEST MODES FOR CARRYING OUT THE INVENTION

Figure 4:
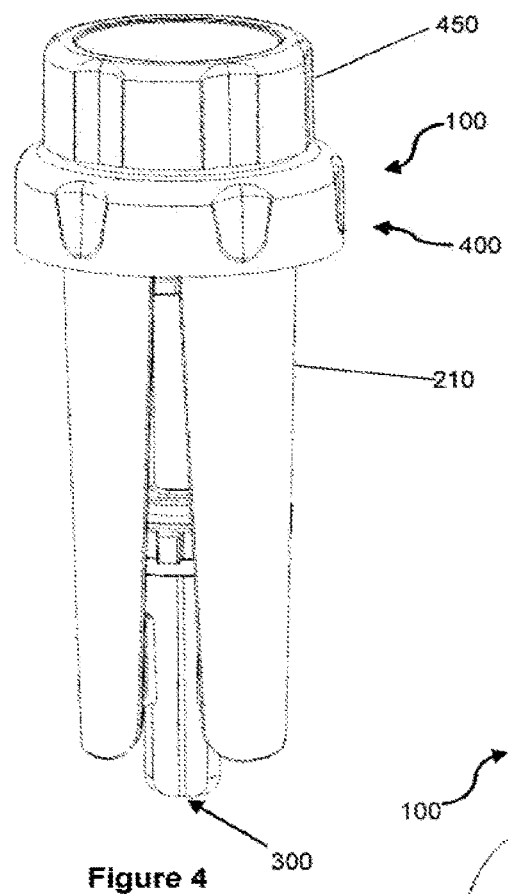
FIG. 4 is a perspective view of an embodiment of the device in a sealed second position.
Figure 5:
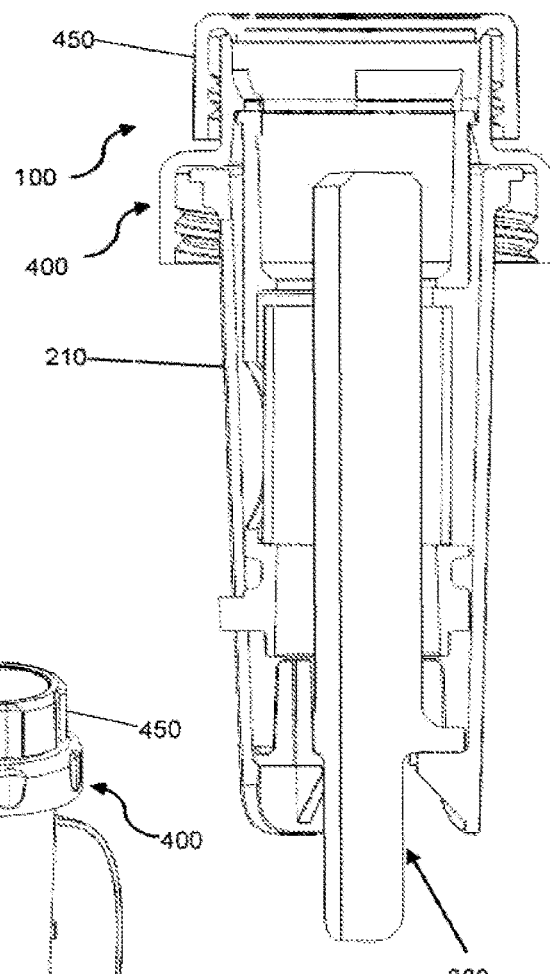
FIG. 5 is a cross-sectional view of an embodiment of the device in a sealed second position.
Figure 6:
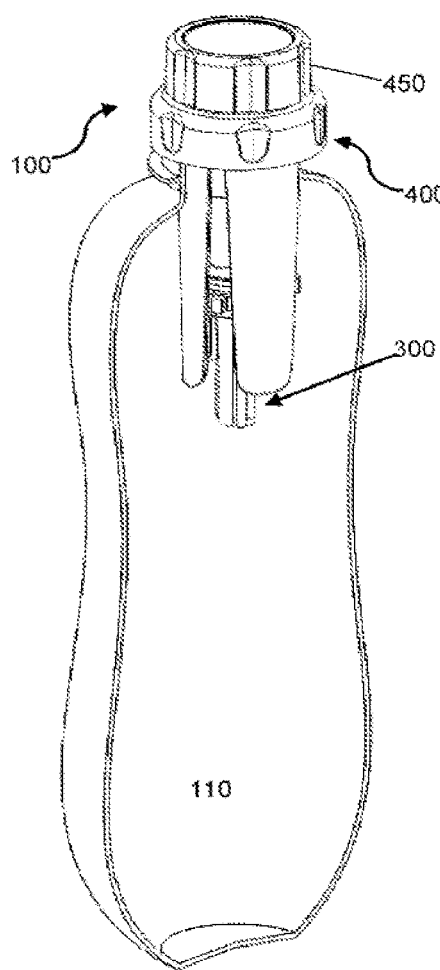
FIG. 6 is a cross-sectional side view of an embodiment of the device resting on a container in a sealed second position.
Figure 7:
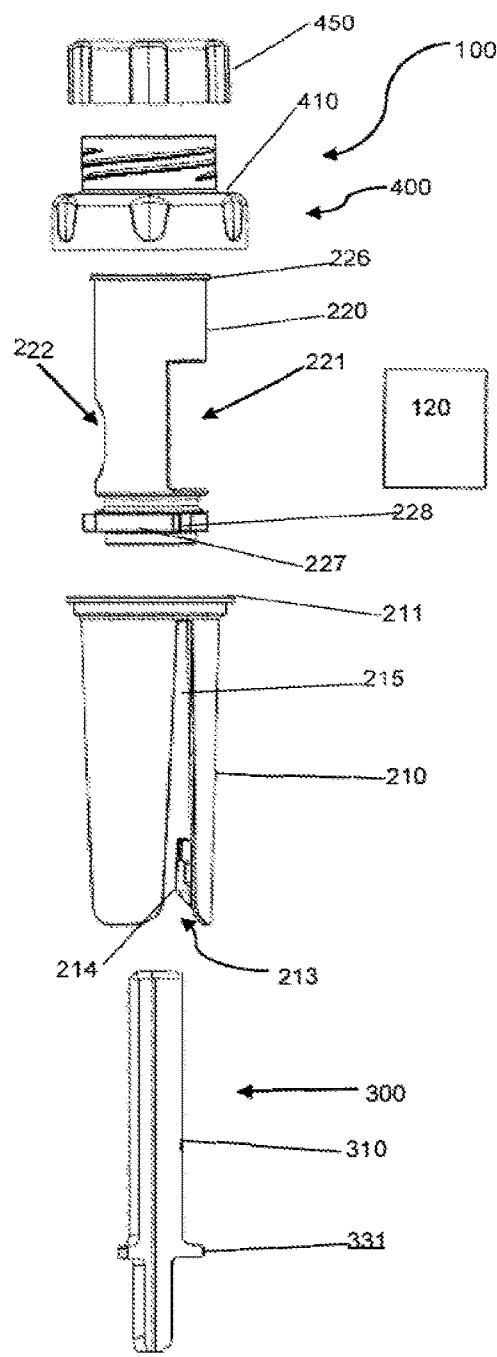
FIG. 7 is an exploded view of the individual components of an embodiment of the device, including a body having a first member and a second member; piercing means, sealing means, a removable cap, a capsule.
Figure 8:
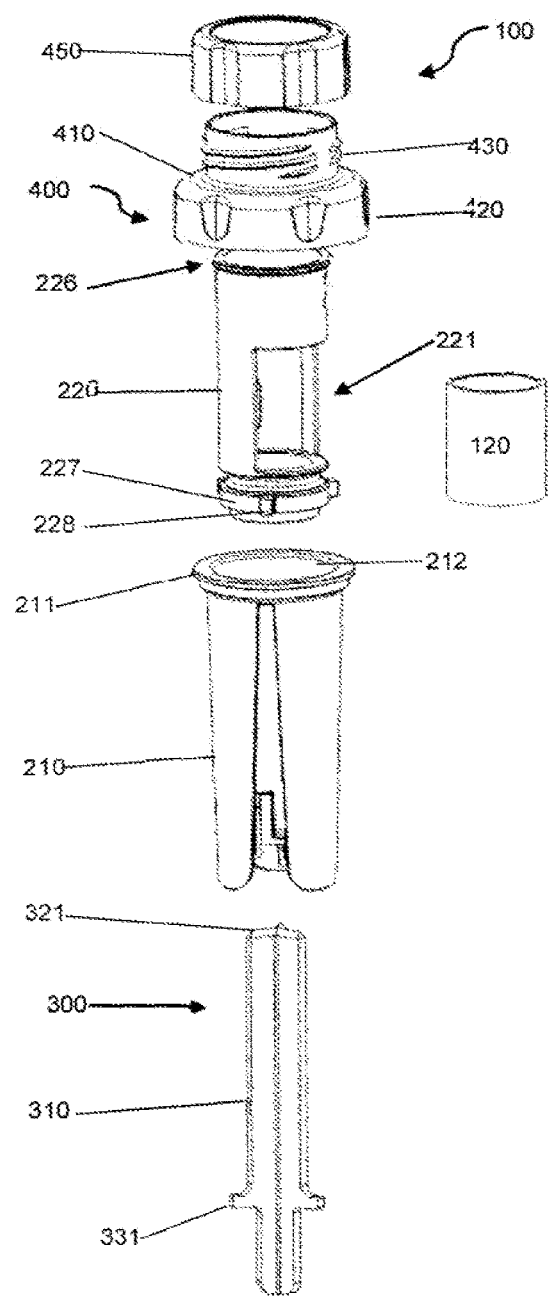
FIG. 8 is an exploded view of the individual components of an embodiment of the device, including a body having a first member and a second member; piercing means, sealing means, a removable cap, a capsule.

Further aspects and advantages of the present invention will become apparent from the ensuing description which is given by way of example only.

Referring first to FIGS. 1-8 showing a reusable dispensing apparatus generally indicated as (100). The dispensing device (100) includes a body (200) having a chamber (221), piercing means (300) and sealing means (400).

The body includes a first member (210) and second member (220) in a telescopic configuration. The first member (210) having an upper lip portion (211) to enable the body (200) to sit on top of the opening of the container (110) without falling into the container (110).

The first member (210) and second member (220) are generally cylindrical in shape and includes a hollow interior space therein.

The second member (220) comprises an opening to define a chamber (221) to receive a capsule (120), and is configured to telescopically slide within the first member (210).

The capsule (120) is a generally hollow cylindrical body defining a volume therein suited to contain a substance or ingredient to be dispensed. One or both ends of the capsule (120) may be sealed off by plastic, foil or a suitably frangible material that is adapted to break when suitable force is applied.

The capsule (120) can be in the form of a small case, pod or container adapted to store at least one substance or ingredient therein. The capsule (120) may contain multiple compartments separated by an internal wall to separately store two or more different substances or ingredients therein.

The capsule (120) can be molded from a durable material such as plastic or metal, and can be either transparent or colour coded to aid in the identification of substance stored therein.

The capsule may be sealed at one or both ends by plastic, foil or any other frangible material designed to break when appropriate force is applied. Alternatively, the capsule can also be sealed by a biodegradable material or water soluble material designed dissolve once in contact with water. It will be well understood that the internal wall of a multi-compartment capsule will be formed of a similar material as described for the seal material.

It will be appreciated that other forms or shapes of capsules can be adapted to be used with the device of the present invention, For example, pods or capsules in the shape of a pill with rounded ends could be utilised, particularly if such ends were formed of a water soluble or degradable material.

Sealing means (400) having a removable cap member (450) is configured to seal the device (100) onto the opening of the container (110) and is connected to the second member (220).

Referring now to FIGS. 1 to 6, showing aspects of the device (100) in an assembled unsealed first position (FIGS. 1-3) and an engaged sealed second position (FIGS. 3-6).

Loading the device (100) with a capsule (120) in the chamber (221) can be done with the device (100) sitting within the opening of the container (110), or done prior to positioning the device onto the container (110).

This allows for efficiency and control when inserting the capsule (120) as the chamber (221) is always exposed/visible to the user. The shape of the chamber (221) is configured to receive the size and shape of the capsule (120), requiring little effort on the part of the user to insert the capsule (120) into the chamber (221).

Generally, the container (110) may comprises a liquid substance such as water for mixing with the substance contained in the capsule (120). But it will be understood that other liquids such as milk, juice, soda or the like can be used.

Pressing down axially on the device (100) via sealing means (400) to move from an unsealed first position to tan engaged second position forces the second member (220), with the capsule (120) contained within the chamber (221), to slide telescopically into the hollow space of the first member (210), forcing the capsule (120) onto the piercing means (300) to pierce at least one wall of the capsule (120)—not shown.

Engaging the sealing means (400) to seal the device (100) onto the container (110) ensures the dispensed contents are contained within the container (110). The user can then shake or agitate the container (110) to disperse the contents of the capsule with the liquid substance in the container. Access to the dispensed contents is provided by removing the removable cap (450).

As can be seen, the device (100) is adapted to be used on the container (110) itself and does not require the user to remove the device (100) in order to access the dispensed contents of the container. The dispensed capsule is configured to remain within the container while the device is attached to the container. This minimizes wastage and ensures the contents of the capsule are substantially dispensed into the container. The capsule can be removed once the user has finished the drink or at any time by unsealing the device from the container.

Figure 9:
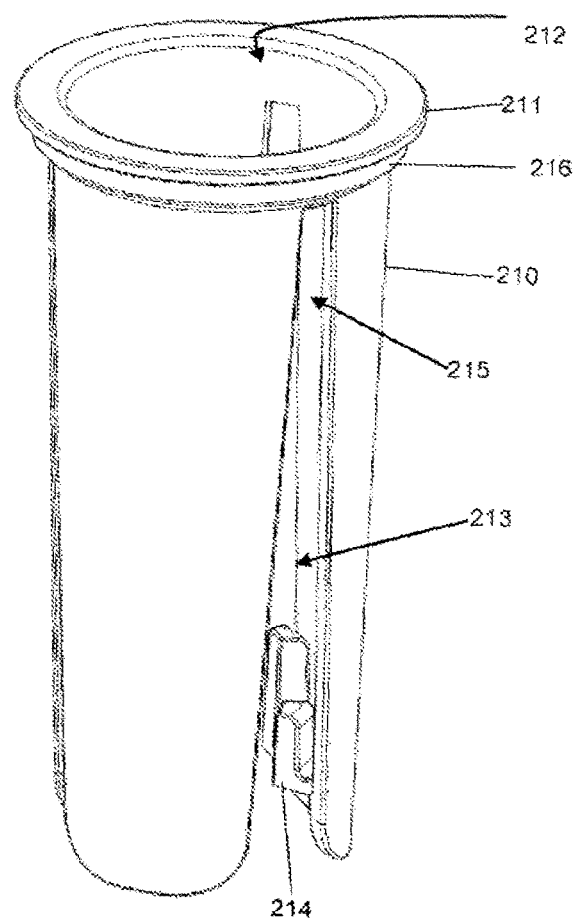
FIG. 9 is a perspective view of the first member of the body.
Figure 10:
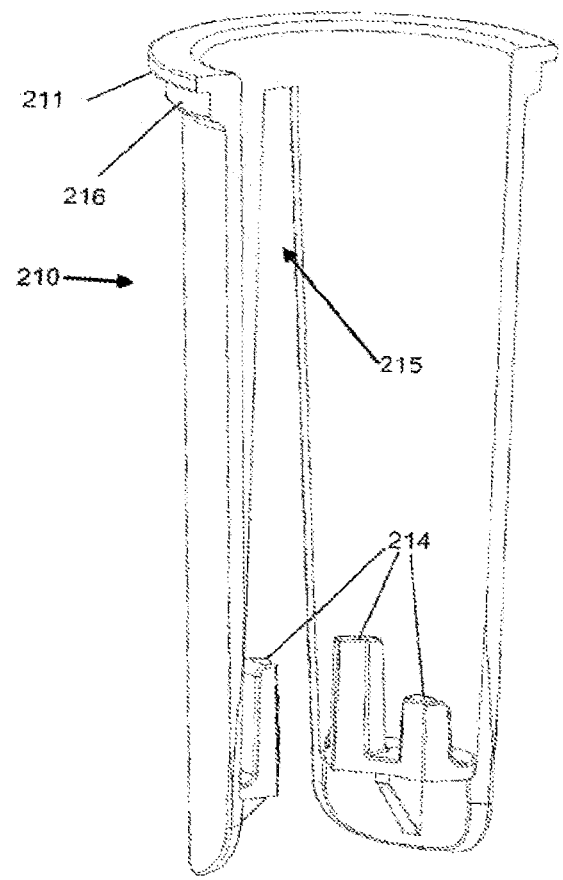
FIG. 10 is a cross-sectional view of the first member of the body.
Figure 11:
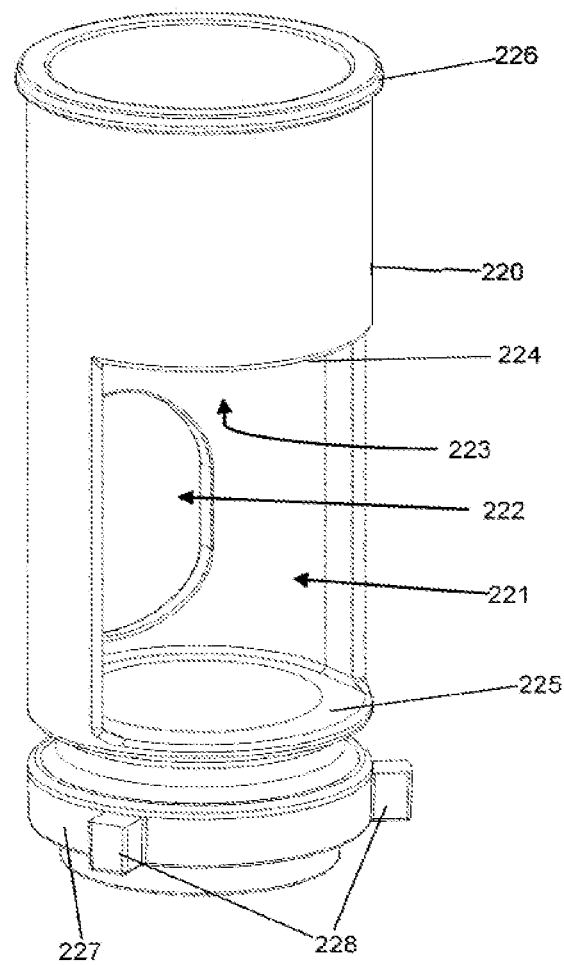
FIG. 11 is a perspective view of the second member of the body.
Figure 12:
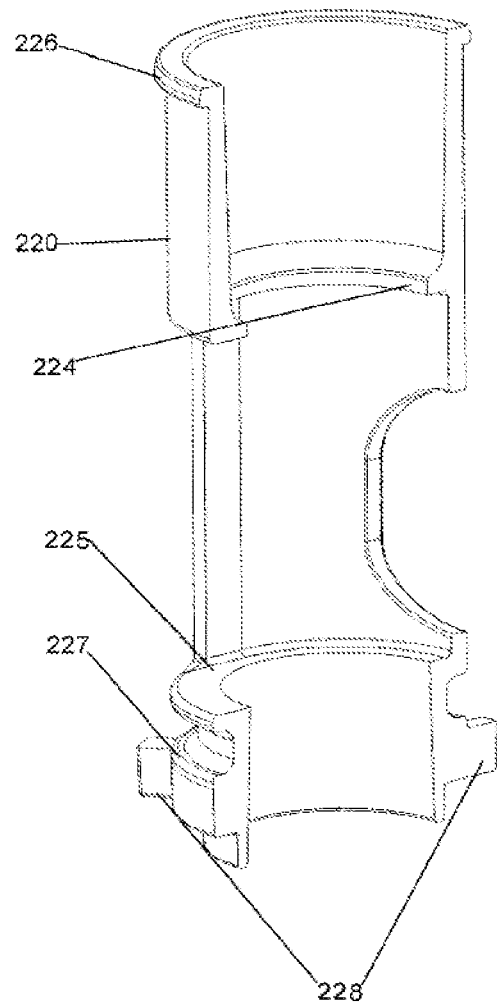
FIG. 12 is a cross-sectional view of the second member of the body.

Referring now to FIGS. 9 and 10, showing aspects of the first member (210) of the body (200) of the device (100).

The first member (210) is generally cylindrical in shape and is configured to sit almost entirely within the interior space of the container (110) itself. The first member (210) includes an upper lip portion (211) extending outwardly around the perimeter of the first member (210) to enable the body (200) to sit on top of an opening of the container (110) without falling into the container (110).

The first member (210) further includes a neck portion (216) below the lip portion (211), which is of a size or circumference slightly greater than the opening of the container, but is a size or circumference smaller than the lip portion (211) itself, so the first member can be wedged onto the opening of the container (110) via a friction-fit arrangement to secure the body thereon.

The lip portion (211), neck portion (216) and main body of the first member (210) being in a tapered arrangement.

This arrangement ensures the likelihood of the body popping out of the container (110) due to the force released by the biasing mean as the device is released from the second engaged position to the first position is reduced.

It will be appreciated by the person skilled in the art that the lip portion (211) can also be adapted or configured to be retained on the opening of the container (110) to connect the body onto the opening of the container without it falling into or out of the container.

This could be achieved by including a connector portion on the lip portion to connect the lip portion of the body onto the opening of the container by rotational/screw-fit arrangement or click-fit arrangement.

Figure 29:
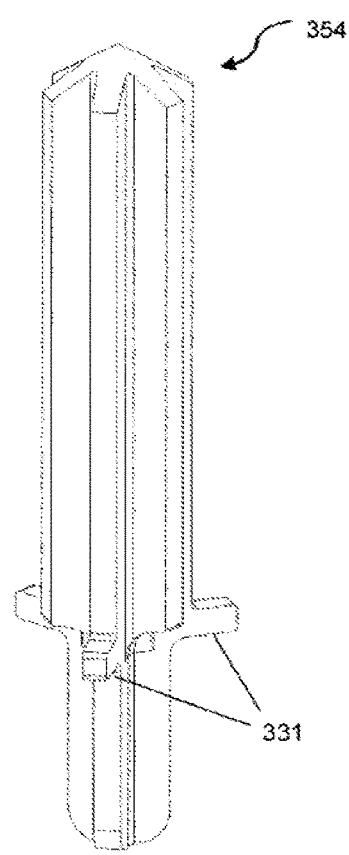
FIG. 29 is a perspective view of an alternative embodiment of the piercing means.
Figure 30:
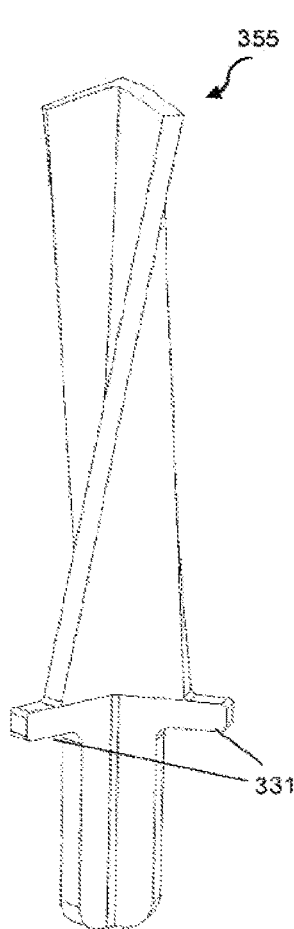
FIG. 30 is a perspective view of an alternative embodiment of the piercing means.

The first member (210) includes a first opening (212) configured to engage with and receive the second member (220). A substantially hollow interior space (213) is defined within the first opening (212) to receive the second member (220), piercing means (300) and optionally biasing means (500) (see FIGS. 3 and 28-29). The hollow interior space (213) further allows contents from a pierced capsule (120) to enter into the container (110).

The hollow interior space (213) is configured to receive biasing means (500) and piercing means (300) in a detachable connection.

The first member (210) includes at least one groove channel(s) (215) configured to define a path for the second member to telescopically slide within the hollow interior space (213). The groove channel(s) (215) extends axially down the first member (210), but does not extend along the entire length of first member (210), ceasing at or near the upper lip portion (211). The end of the groove channel(s) (215) defines a stop for the second member (220) and ensures the second member (220) remains securely in place when the device (100) is moved from a first unsealed position to a sealed second position (and vice versa).

As shown in FIGS. 9 and 10, the groove channel(s) (215) is narrow at one end towards the upper lip portion (211) and widens at the opposite end.

It will be appreciated by the person skilled in the art that different arrangements or configurations of groove channels can be employed with the present invention without departing from the spirit and scope of the invention. For example, while the groove channels have been described as extending axially along the first member, groove channels in the form of a spiral or helical nature can also be employed with the present invention. Further, an internal groove channel could be located on an interior surface of the first member to define the telescopic path of the second member. In such an arrangement, it will be appreciated that the groove channel(s) will not be visible on the external surface of the first member, with the first member being of a general solid cylindrical member when viewed externally.

A plurality of retaining members (214) located and formed on an interior surface of the first member (210) and extending inwardly towards the interior space (213) are adapted to receive piercing means (300) and optionally biasing means (500).

The retaining members (214) are configured to detachably connect the piercing means (300) thereon.

The retaining members (214) are in the form of hooks extending partially upwardly towards the upper lip portion (211). A pair of spaced apart hooks define a gap to receive arms (331) of the piercing means (300). While the space created between the hooks and the interior surface of the first member is configured to receive biasing means (500).

At least one hook extends further axially towards the upper lip portion (211) than the other. The differently sized hooks define a stop when inserting the piercing means (300). Piercing means can be inserted from the bottom or top opening of the first member (210), and by rotating the piercing means (300) relative to the first member (210), the arms (331) of the piercing means will abut the hook extending further axially, indicating to the user that the piercing means can then be housed into the gap created by the two spaced apart hooks by a friction fit arrangement.

The hook(s) are integrally formed on the interior surface of the first member (210).

As can been seen in FIG. 10, retaining members (214) are located in between the groove channel(s) (215) on an interior surface of the first member.

It will be appreciated by the person skilled in the art that other configurations of retaining members and/or the arms of the piercing can be adapted or configured to be used to retain the piercing means within the first member. For example, retaining members comprising apertures or a recessed portion could be used to receive the arms of the piercing member. Alternatively, snap-fit or click-fit configurations could be also used to retain the piercing means.

Referring now to FIGS. 11-14, showing aspects of the second member (220) of the body (200) of the device (100).

The second member (220) is also generally cylindrical in shape having a generally hollow interior space therein, with an interior and exterior surface and is adapted to telescopically slide with respect to the first member (210). The second member (220) includes a chamber (221) within the hollow interior space being defined by an opening on a front wall the second member (220).

A top interior lip portion (224) and a bottom interior lip portion (225) located on an interior surface of the second member (220) and extending inwardly towards the interior space (223) further defines the chamber (221).

The distance between the top and bottom interior lip portions (224, 225) are configured to the dimension of the capsule (120) intended to be used and ensures the capsule (120) is positioned within the chamber (221) securely.

It will be appreciated that circumference of the first and second members (210 and 220) can be adapted or configured as required to suit the opening of the intended container to be used without departing from the spirit or scope of the present invention.

Further, it will also be understood by the person skilled in the art that the size of the chamber and respective distance and size of the top and bottom interior lip portions (224, 225) can be adapted to suit capsules of differing size as required without departing from the spirit and scope of the present invention.

In this configuration, the chamber (221) is exposed to the user at all times when the device is in the unsealed first position, and does not require the user to assemble any components to gain access to the chamber. This allows for efficiency and control when inserting the capsule (120) into the device (100). As the top and bottom interior lip portions (224, 225) are configured to be the same the same dimension of the chamber entrance, this helps the user to guide the capsule (120) into the chamber easily by allowing the user to rest it one of the top or bottom interior lip portions and pushing the capsule (120) into the chamber (221) without any thought of misaligning or incorrect insertion.

An aperture (222) located on a back wall of the second member (220) opposite to the opening defining the chamber (221) provides an additional means to disperse the contents of the capsule (120) once it has been pierced.

The aperture (222) also allows convenient "back-end" access to the chamber (221) to assist in discarding of used capsules, or removal of undesired capsules when the user changes their mind, allowing the user to insert a finger through the aperture to push out the capsule from the chamber.

The second member (220) further includes a top exterior lip portion (226) a bottom exterior lip portion (227) extending around the perimeter of the second member configured to connect to sealing means (400) and the first member (210) respectively.

The bottom exterior lip portion (227) comprises at least one protruding arm(s) (228) extending outwardly from the bottom exterior lip portion (227). The protruding arm(s) (228) is/are in a spaced apart relationship configured to communicate with groove channel(s) (215) of the first member (210) and defines a path for the second member (220) to slide telescopically in relation to the first member (210).

The arm(s) (228) abut the end of the groove channel(s) (215) at or near the upper lip portion (211) of the first member (210) and ensure the second member (220) is in a secure relationship with respect to the first member (210).

The top exterior lip portion (226) is configured to communicate and connect the second member (220) with the sealing means (400).

Optionally, this configuration is in the form of a detachable connection between the second member (220) and the sealing means (400).

This connection further provides a secure telescopic relationship between the first member (210) and the second member (220) as the connected sealing means (400) provides a 'stop' and abuts the upper lip portion (211) of the first member (210) to prevent the second member from sliding into the first member (210) completely.

As can be seen in FIGS. 1-6, the range of motion of the second member (220) is restricted to only slide telescopically within the interior space (213) of the first member (210). The arms (228) and groove channel(s) (215) restrict rotational movement of both the first (210) and second (220) members relative to one another.

The features of the second member (220) as described, particularly with reference to the top (224) and bottom (225) interior lip portions, top and bottom exterior lip portions (226, 227); arms (228) and aperture (222) are integrally formed on the second member (220) itself.

Figure 15:
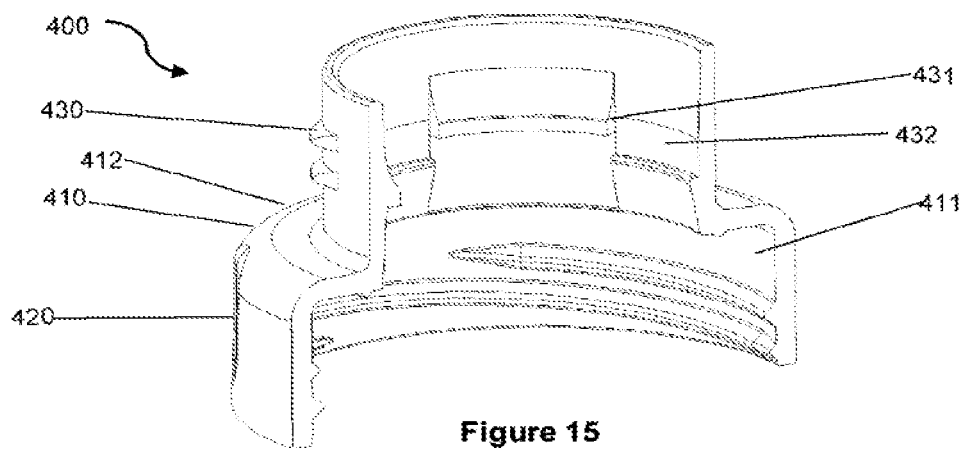
FIG. 15 is a perspective cross-sectional view of the sealing body.
Figure 16:
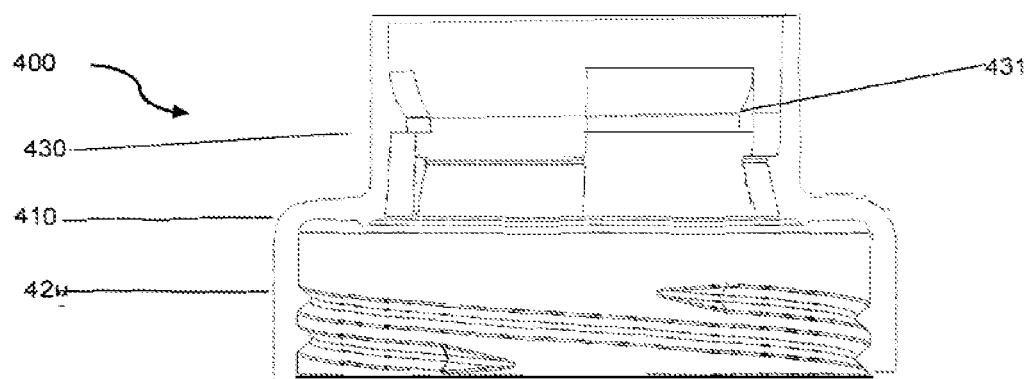
FIG. 16 is a cross-sectional view of the sealing body.
Figure 17:
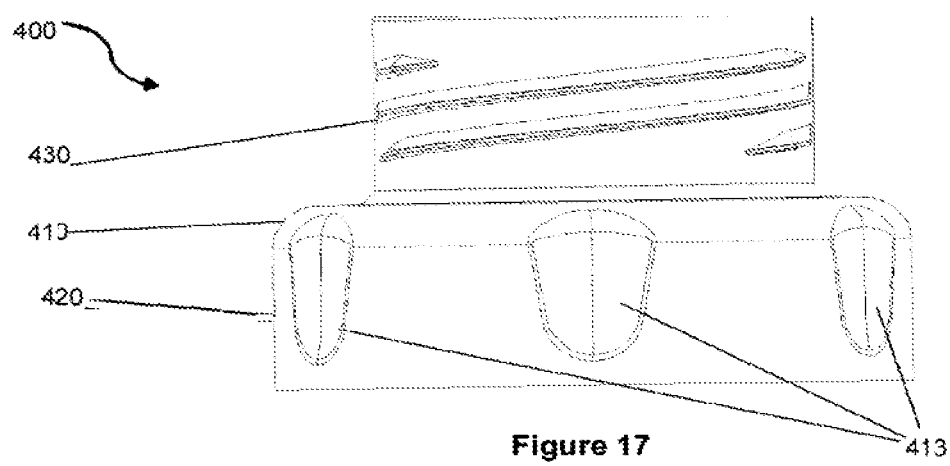
FIG. 17 is a side view of the sealing body.

With reference to FIGS. 15-17 showing aspects of the sealing means (400).

Sealing means (400) is connected to the second member (220) of the body (200) and is configured to seal the device (100) onto the container (110).

The sealing means (400) includes a sealing body (410) having a first connection means (420) configured to communicate and receive an opening of the container (110), and a second connection means (430) configured to communicate and receive a removable cap member (450) to allow the user access to the contents of the container (110) once the device (100) has been sealed onto the container (110).

The sealing body (410) is connected to the second member (210) via a click-fit arrangement well-known in the art. This connection allows unrestricted rotation of the sealing body (410) relative to the second member (220) about a single rotational axis.

It will be appreciated other connection mechanisms allowing the sealing body (410) to rotate freely with respect to the second member (210) can be employed without departing from the spirit and scope of the invention.

The click-fit arrangement further allows the respective components to be easily disassembled for cleaning of the components if required.

The sealing body (410) includes an interior surface (411) and an exterior surface (412), and a hollow interior space.

The exterior surface (412), at or near the first connection means (420), comprises gripping means in the form of grooves or recesses (421) to allow the user to grip the sealing body (410) and seal (or unseal) the sealing means (400) on to the container (110).

The interior surface (411), at or near the first connection means (420), comprises a helical screw arrangement corresponding to and cooperating with an opposing helical screw arrangement of the neck of the container (110).

The exterior surface (412), at or near the second connection means (430), comprises a helical screw arrangement corresponding to and cooperating with an opposing helical screw arrangement of the removable cap member (450).

The interior surface (411), at or near the second connection means (430), comprises opposing spaced apart internal lip segments (431) protruding inwardly towards the interior surface of the sealing body (410). The opposing internal lip segments (431) extend partly around the interior surface in an alternate spaced apart arrangement to define an interior ring (432) to receive the top exterior lip portion (226) of the second member (220) in a click-fit connection.

This connection allows unrestricted rotation of the sealing body (410) about a single rotational axis relative to the second member (220).

In use, the user places a capsule (120) into the chamber (221) and presses downwardly on the device (100) via the sealing means (400) to move from the unsealed first position to the engaged second position. This movement forces the second member (220) to slide telescopically into the first member (210). As the sealing body (410) is free to rotate relative to the second member (220), the container (110) is simply sealed by the user by twisting or screwing the sealing body (410) to attach the first connection means (420) onto the container (110).

Generally, the circumference of the first connection means (420) is larger than that of the second connection means (430). However, it will be appreciated by the person skilled in the art that the size and diameter of the first and second connection means (420, 430) can be easily adapted and/or modified to suit the type of container and/or desired size of removable cap without departing from the spirit and scope of the present invention.

Further, while it will be appreciated that helical screw arrangements have been discussed as the sealing connection, it will be well understood by the person skilled in the art that other connection means for sealing of containers can be used with the present invention. For example, click fit or snap-fit sealing arrangements, friction fit sealing means could all be employed as sealing connections in the present invention.

Figure 18:
FIG. 18 is a cross-sectional view of the removable cap.
Figure 19:
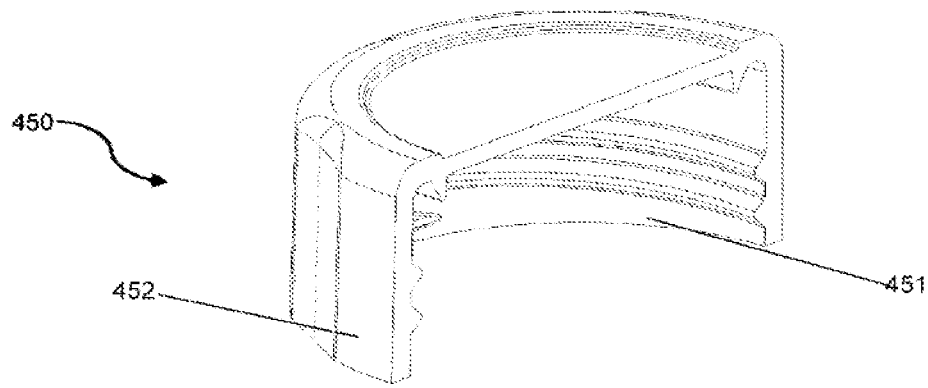
FIG. 19 is a perspective cross-sectional view of the removable cap.
Figure 20:
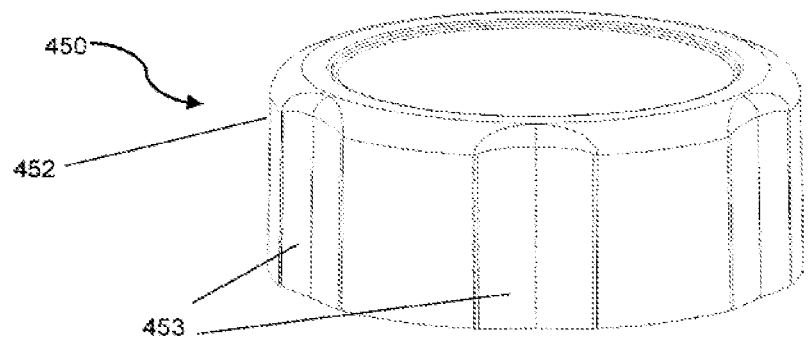
FIG. 20 is a perspective view of the removable cap.

FIGS. 18-20 show aspects of the removable cap (450).

The removable cap (450) comprises an internal (451) and external (452) surface and is adapted to be screwed on to the second connection means (430) of the sealing body (410).

The external surface (452) comprises gripping means in the form of grooves or recesses (453) to provide dexterity and allow the user to grip the removable cap (450) and seal or unseal the removable cap (450) from the sealing body (410) when the device (100) is attached to the container (110).

The internal surface (452) comprises a helical screw arrangement corresponding to and cooperating with an opposing helical screw arrangement of the exterior surface of the second connection means (430).

It will be understood by the person skilled in the art that the use of helical screw arrangements as disclosed is merely one way of sealing and closing a container (110) and removable cap (450), however other arrangements to seal and close such as snap-fit or click fit connections or the like can be used without departing from the spirit or scope of the present invention.

In an alternative embodiment, the sealing body (410) may be adapted to comprise a nozzle or spout well-known in the art, wherein the second connection means (430) can suitably adapted to be in the form of a dust cap or other removable cap assembly.

Similar to the removable cap (450), the spout or nozzle allows a user convenient access to the dispensed contents within the container without having to remove the entire device (100) from the container (100).

Figure 21:
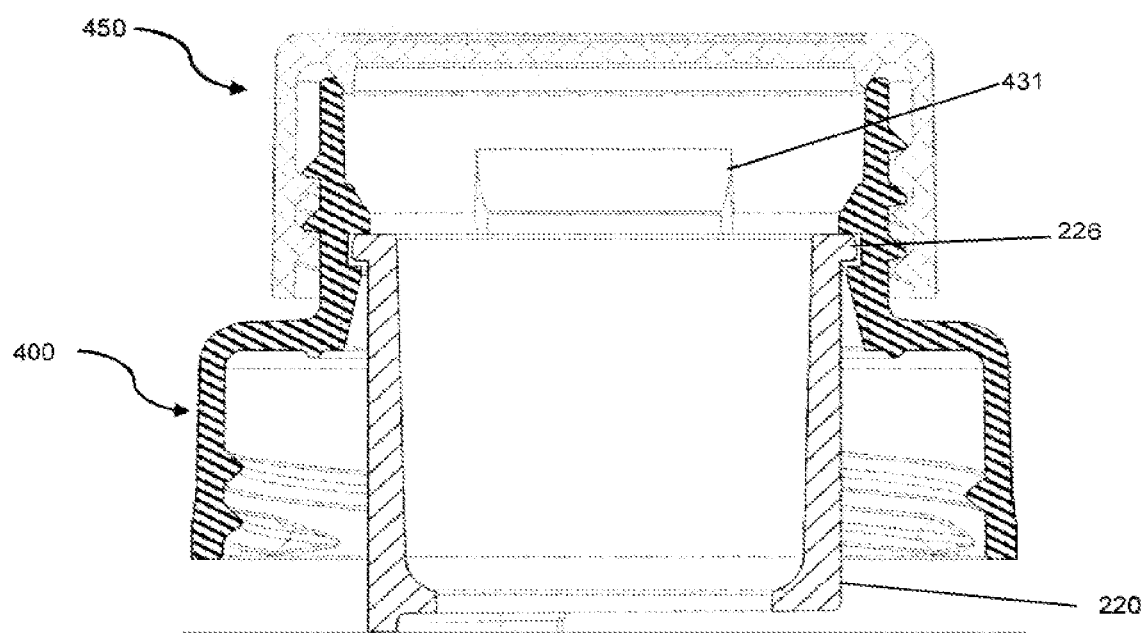
FIG. 21 is a close-up cross-sectional view of the second member, sealing means and removable cap
Figure 25:
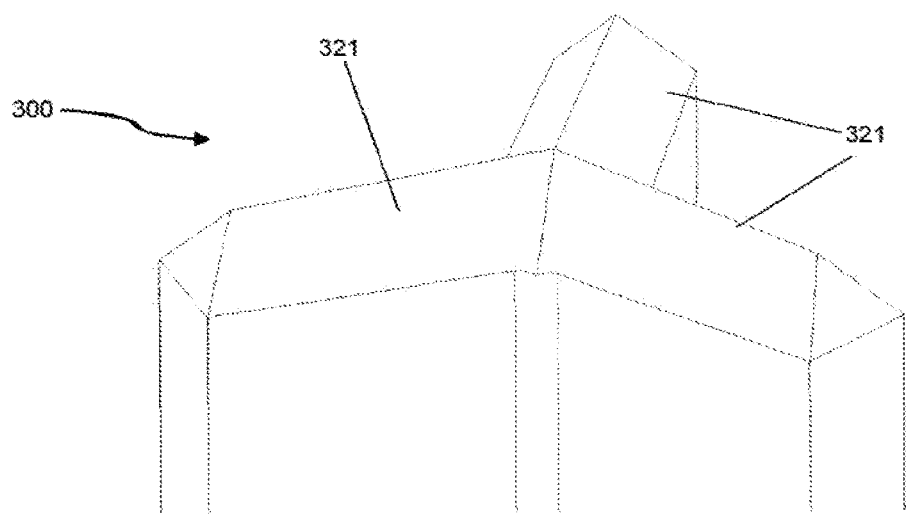
FIG. 25 is a close up view of the beveled edges of the piercing means.

With reference to FIG. 21, showing aspects of the top portion of the device (100), in particular the connection relationship between the second member (220), sealing means (400) and removable cap (450).

With reference to FIGS. 22-25 showing aspects of the piercing means (300).

Piercing means (300) comprises a main member (310) having a first end (320) and a second end (330). The main member (310) is elongated in shape and includes fins (340) to define flow channels (341) along the main member (310) to allow the contents of the capsule to pass through once the capsule has been pierced.

The elongated main member (310) includes at least one beveled edge (321) located on the first end (320) to pierce through at least one wall of the capsule (120).

The main member (310) is configured to be housed within the interior space (213) of the first member. Arms (331) extending outwardly near the second end (330) of the main member (310) are configured to communicate with retaining member(s) (214) of the first member (210) to secure the main member (310) therein.

In a further embodiment, the main member (310) is detachably connected to the first member (210). This allows the main member (310) to be removed if required for cleaning or replacement due to wear and tear. Further, it is envisaged and main member (310) can be interchanged with other piercing means with additional features such as filters or different piercing elements for use with different capsules (120).

In use, the main member (310) is secured into position by arms (331) being fixed to the retaining member(s) (214) of the first member (210). The main member is fixed into position and does not move in relation to the device (100). In this arrangement, the first end (320) is positioned to rest at or near the upper lip portion (211) of the first member (210).

When a capsule (120) is positioned into the chamber (221), the beveled edges (321) at the first end (320) of the main member (310) is in close proximity to a bottom wall of the capsule (120).

Pushing downwardly on the device (100) via sealing means (400) to move the device from the unsealed first position to the engaged second position to seal the container (110) forces the capsule (120) on to the beveled edges (321) and pierces the bottom and a top wall of the capsule. The flow channels (341) defined by fins (340) guide the contents of the pierced capsule (120) down into the container (110).

Piercing both a top and bottom wall of the capsule provides advantages in that it ensures the contents of the capsule are dispensed efficiently and effectively into the container and reduces unnecessary wastage.

In a preferred embodiment, capsules (120) sealed with foil on both ends are intended to be used with this device (100).

This allows the user to insert the pod either way, limiting the chance of incorrect insertion into the chamber (221). This differs from prior devices and capsules, which require the pod/capsule to be inserted correctly or in a particular fashion in order for the devices to work.

As mentioned previously, the device (100) is designed so that the capsule (120) remains within the device (100) when container (110) is sealed. This reduces the chance of a user inadvertently removing a partially dispensed capsule.

Further, the flow channels (341) also aid in mixing of the dispensed contents by allowing liquid contained in the container to freely enter into the pierced capsule along flow channels (341) to mix and release any further material still within the capsule (120). Additionally, this arrangement also ensures the capsule is flushed out each time the user takes a drink from the container as the capsule remains in direct communication with the liquid of container at all times. This further provides added convenience for disposal of used capsules with no mess as only the capsule shell remains.

In a further embodiment, the length of the elongated member (310) can be adjusted to only pierce a single wall of the capsule. This may be suitable for instances where the substance contained in the capsule is in liquid form, and therefore may not require both walls to be pierced.

In an alternative embodiment, FIGS. 26-31 show alternative piercing means (351, 352, 353, 354, 355, 356) adapted for use in accordance with the present invention. The second end (330) of these alternative embodiments comprise the same fins (340) and arms (331) as the piercing means (300) described above and are adapted to be interchangeable with the device (100).

Referring to FIGS. 32 and 33, the device (100) further includes biasing means (500) within the first member (210). The biasing means (500) is in the form of a resilient material such as a spring (510) and configured so that the device is automatically biased to a first unsealed position with respect to the first member (210) and the second member (220) when not in use.

As it will be appreciated, this provides an added convenience to the user who is able to have the device on hand in a ready to use state at all times, provided the device is not already sealed on a container.

Further, the biasing means (500) requires force on the part of the user to move the device to an in use engaged second position. The anticipated force required on the part of the user will also help to provide mental encouragement to exert the required force to pierce the walls of the capsule (120).

The biasing means allows the second member and consequently the chamber (221) to always be in the upright position when not sealed on a container. This increases the ease of use and the efficiency/smoothness of the experience of using the device (100).

It will be understood that biasing means (500) is optional feature of the device. The second member (220) is free to slide telescopically with respect to the first member (210) by manual operation without the biasing means.

As can been seen by the figures, the present device (100) provides for a reusable, convenient and easy to use device without requiring assembly. While certain components of the device can be disassembled for cleaning purposes if required, the device is intended to remain as an assembled single unit. This differs to prior art devices which requires assembly of multiple components each time the user intends to use the device. Further, loss or failure of a single component in such devices often leads to the device itself being unusable.

Additionally, the user is able to use the device to freshly prepare a drink at their own convenience, with the knowledge that the drink that they have prepared has not been sitting on a shelf for months or years.

It will be appreciated that the user will also have the ability to choose the type of drink they would like to consume by selecting an appropriate ingredient capsule. A wide range of different substances and formulations can be stored in the capsules. The user is not limited to a particular drink with the present device.

Further, the capsules can also be adapted to contain specific measured doses of certain ingredients or formulations, to provide further convenience to the user. For example, capsules can be adapted to include diet drink powders, sports drinks powders, liquor, a specific dose of medication or pharmaceuticals, a protein formulation for a pre/post work out drink, powdered baby formula or any other substance that would be conveniently stored and be ready to mix with another substance or liquid such as water, milk, juice or soda for example.

Additionally, it will be understood, the sealing means (400) can easily be adapted to suit a range of different containers currently on the market. This provides the user with the added benefit of being able to reuse their own containers or bottles, reducing unnecessary waste. The container may be a bottle made of glass or plastic. Similarly, the container may be a plastic container, a carton, a steel canister or the like.

The telescopic motion of first member and second member (210, 220) in the device to pierce the capsule together with the independent rotation of the sealing means (400) is unique and provides for a more robust action that can be repeated numerous times without failing. This differs to prior art device which require a twisting or screwing rotation in order to pierce the capsule. Such motion relies heavily on the screw tread arrangement in the device to aid this motion and is prone to user error where they may over screw or tighten, this will lead to wear and tear after a limited number of uses or in some cases breaking the member off completely. In some circumstances the user may also "under screw", which may lead to incorrect or incomplete piercing of the pod or capsule, resulting in a reduced amount being dispensed and unnecessary wastage.

It will be appreciated that the components of the device such as the first and second member (210, 220), sealing means (400), piercing means (300) and removable cap (450) can be formed out of a suitably hard durable material, able to withstand repetitive use. Such materials can include, but not necessarily limited to, plastics such as PET, polypropylene and the like; metallics such as aluminum, stainless steel and the like; silicon, carbon fibre or any other suitable materials.

It is also envisaged by the inventors that the device can be adapted to be used with dispersible or disintegrating tablets instead of pods or capsules. Such tablets are widely known in the art and can used on its own, or the tablets can include a water-soluble barrier layer to ensure the tablet is sealed from external environmental factors.

Figures 26, 27, 28:
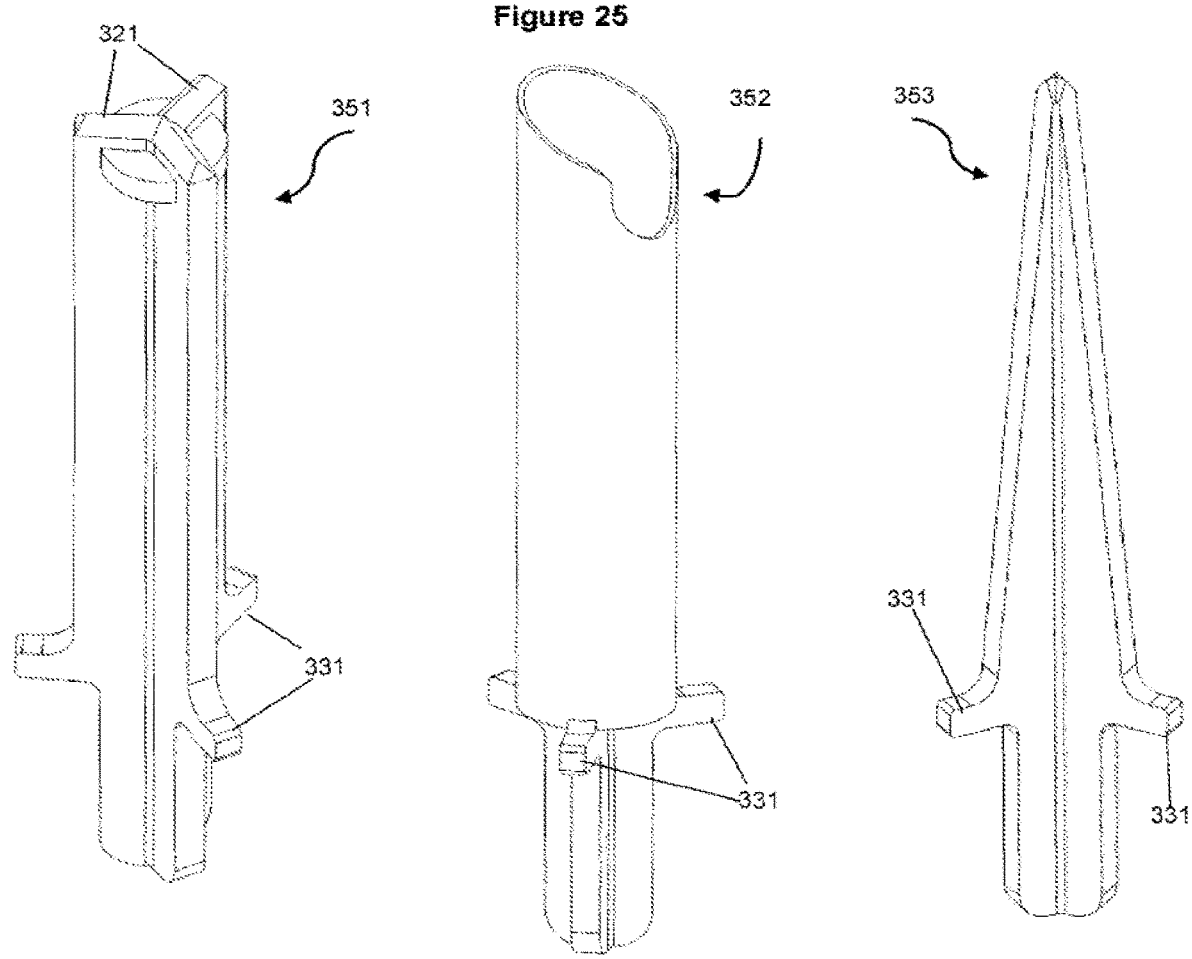
FIG. 26 is a perspective view of an alternative embodiment of the piercing means.
FIG. 27 is a perspective view of an alternative embodiment of the piercing means.
FIG. 28 is a perspective view of an alternative embodiment of the piercing means.
Figure 31:
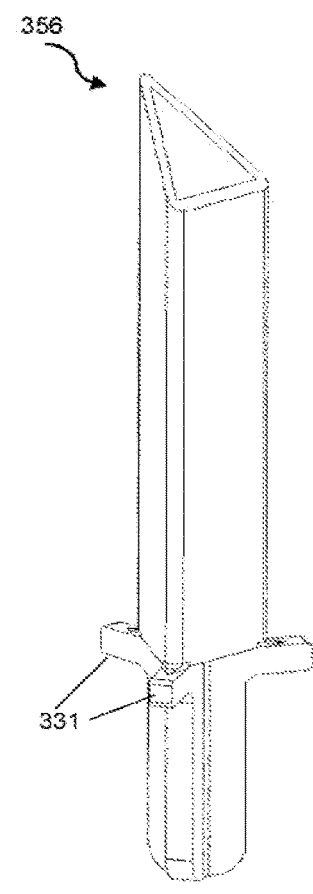
FIG. 31 is a perspective view of an alternative embodiment of the piercing means.

Use of such tablets with this device can be achieved by selecting an appropriate piercing means (300) having an interior hollow space to accommodate the size and shape of the tablet, such as piercing means 352 and 356 as shown in FIGS. 27 and 31. Flow holes or apertures positioned near the arms (331) allow the dispersible table to flow out and into the container once the tablet has made contact with the liquid in the container.

In a further embodiment, the dispensing device (100) can be configured to be used as a liquid filtering system by use of specialized capsules or pods having filtering means. Such filtering means can be in the form of the capsules being sealed by a semi-permeable membrane or filter known in the art. Capsules can be adapted to contain further substances or ingredients intended to be infused with liquid in the container, or also contain further filtering materials there. Alternatively, the capsule can be empty. In order to adapt the device (100) to be used in this manner, the piercing means (300) can be removed from the device altogether. The specialized capsule can then be inserted into the chamber (221) and used in the manner previously described above.

The specialized capsule in the chamber is locked into position within the container at or near the opening of the container in the engaged second sealed position and provides communication between the liquid contents in the container and the opening of the container.

In use, the liquid in the container is in communication with the filtering means of the capsule when the user takes a drink from the container through the removable cap.

This offers a further advantage over the prior art devices which cannot be modified in such a manner, and provides the user with an additional benefit in using the present device.

The invention may also be said broadly to consist in the parts, elements and features referred to or indicated in the specification of the application, individually or collectively, in any or all combinations of two or more of said parts, elements or features.

Aspects of the present invention have been described by way of example only and it should be appreciated that modifications and additions may be made thereto without departing from the scope thereof as defined in the appended claims.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

What we claim is:

1. A reusable dispensing device for dispensing contents of a capsule into a container, the device including:
    a body having a chamber configured to receive a capsule, the body including a first member and a second member in a telescoping configuration, the second member configured to telescopically slide into the first member;
    wherein the first member is located within an interior space of the container and comprises an upper lip portion to enable the body to sit on the opening of the container without falling into or out of the container, the first member further comprising at least one groove channel extending axially down the first member;
    wherein the second member comprises an opening providing access to the chamber, the second member being telescopically moveable between an unsealed first position and an engaged second position;
    piercing means configured to pierce the capsule, wherein the piercing means is fixed to the first member; and
    sealing means configured to seal the container by moving downwardly to telescopically move the second member from the unsealed first position to the engaged second position, wherein the sealing means includes a sealing body coupled to the second member and configured to receive an opening of the container and a removable cap adapted to be selectively removed by a user from the sealing body to access contents of the container;
    wherein telescopic movement of the second member from the unsealed first position to the engaged second position to seal the device onto the container engages the piercing means to pierce the capsule and dispense contents from the capsule into the container.

2. The device of claim 1, wherein the first member and second member are substantially cylindrical, having a hollow interior space.

3. The device of claim 1, wherein the second member includes an opening to define the chamber.

4. The device of claim 1, wherein the second member further includes an aperture on an opposing back wall to the opening to provide access to the chamber.

5. The device of claim 1, wherein the sealing means is rotatably connected to the second member.

6. The device of claim 5, wherein the connection between the sealing means and second member allows for unrestricted rotation of the sealing means relative to the second member about a single rotational axis.

7. The device of claim 1, wherein the second member includes an upper external lip portion.

8. The device of claim 1, wherein the second member includes a lower external lip portion.

9. The device of claim 8, wherein the second member further comprises at least one protruding arm extending from the lower external lip portion.

10. The device of claim 9, wherein at least one protruding arm is configured to communicate with the least one groove channel.

11. The device of claim 1, wherein the piercing means comprises a main member having a first end configured to pierce the capsule and a second end fixed to the first member.

12. The device as claimed in claim 11, wherein the main member is elongated and includes fins to define flow channels along the elongated main member.

13. The device of claim 11, wherein the main member includes at least one beveled edge on located on the first end to pierce a wall in the capsule.

14. The device of claim 11, wherein the main member includes at least one arm extending outwardly near the second end to fix the second end to the first member.

15. The device of claim 1, wherein the piercing means is configured to pierce two or more walls of the capsule to release the contents in the capsule.

16. A reusable dispensing device for dispensing contents of a capsule into a container, the device including:
    a body having a chamber configured to receive a capsule, the body including a first member and a second member in a telescoping configuration, the second member configured to telescopically slide into the first member,
    wherein the first member is located within an interior space of the container and comprises an upper lip portion to enable the body to sit on the opening of the container without falling into or out of the container, the first member further comprising at least one groove channel extending axially down the first member;

wherein the second member comprises an opening providing access to the chamber, the second member being telescopically moveable between an unsealed first position in which the chamber is accessible by a user to insert a capsule into the chamber through the opening and an engaged second position in which a user is blocked from accessing the chamber and the capsule therein through the opening, wherein the capsule contains contents;

a piercing member having a first end configured to pierce the capsule when the second member is in the engaged second position to disperse the contents of the capsule into the container and a second end fixed to the first member to move therewith; and sealing means configured to seal the container by moving downwardly to telescopically move the second member from the unsealed first position to the engaged second position, wherein the sealing means includes a sealing body coupled to the second member and configured to receive an opening of the container and a removable cap adapted to be selectively removed by a user from the sealing body to access contents from the container;

wherein the at least one groove channel of the first member is configured to define a path for the second member to telescopically move relative to the first member, the first member further comprising biasing means located between the first member and the piercing member and configured to bias the second member to the unsealed first position, and wherein telescopic movement of the second member from the unsealed first position to the engaged second position to seal the device onto the container engages the piercing means to pierce the capsule and dispense contents from the capsule into the container.

17. The device of claim 16, wherein the biasing means is a spring.

18. The device of claim 16, wherein the sealing body includes a first connection means configured to secure the sealing body to the opening of the container and a second connection means configured to receive the removable cap.

19. The device of claim 18, wherein the sealing body remains secured to the opening of the container upon removal of the removable cap by a user to keep the pierced capsule inside the container so that the contents of the capsule and the container are accessible to the user.

20. The device of claim 19, wherein the container includes liquid therein, and wherein a first portion of the contents of the capsule mix with the liquid upon movement of the second member from the unsealed first position to the engaged second position and a second, separate portion of the contents of the capsule mix with the liquid of the container when the liquid is drawn through the first and second members and out of the opening of the container by the user.

* * * * *